United States Patent
Bartos

(10) Patent No.: US 9,218,747 B2
(45) Date of Patent: Dec. 22, 2015

(54) SELF-TEACHING AND ENTERTAINMENT GUITAR SYSTEMS

(76) Inventor: James Bartos, Norwood, NJ (US)

( * ) Notice: Subject to any disclaimer, the term of this patent is extended or adjusted under 35 U.S.C. 154(b) by 95 days.

(21) Appl. No.: 12/836,848

(22) Filed: Jul. 15, 2010

(65) Prior Publication Data

US 2011/0011241 A1    Jan. 20, 2011

Related U.S. Application Data

(60) Provisional application No. 61/226,572, filed on Jul. 17, 2009.

(51) Int. Cl.
| | | |
|---|---|---|
| G09B 15/06 | (2006.01) | |
| G10G 1/02 | (2006.01) | |
| G09B 15/02 | (2006.01) | |
| G09B 15/00 | (2006.01) | |

(52) U.S. Cl.
CPC ............ *G09B 15/023* (2013.01); *G09B 15/003* (2013.01)

(58) Field of Classification Search
CPC ... G10H 1/342; G10H 1/0016; G10H 1/0008; G10H 2220/015; G10H 2220/301; G10H 2220/051; G10H 2220/241; G10H 2220/005; G10H 2220/076; G10H 2220/056; G09B 15/00; G09B 15/023; G09B 15/003; G09B 15/006; G10G 1/02; G10G 1/00; G10G 5/005
See application file for complete search history.

(56) References Cited

U.S. PATENT DOCUMENTS

| | | | |
|---|---|---|---|
| 4,559,861 A * | 12/1985 | Patty et al. .................. | 84/470 R |
| 5,373,768 A | 12/1994 | Sciortino | |
| 5,408,914 A * | 4/1995 | Breitweiser et al. ........ | 84/477 R |
| 5,517,891 A | 5/1996 | Sica | |
| 5,796,025 A | 8/1998 | Haake | |
| 5,920,023 A * | 7/1999 | Ravagni et al. ............. | 84/485 R |
| 6,162,981 A | 12/2000 | Newcomer et al. | |
| 6,191,348 B1 | 2/2001 | Johnson | |
| 6,191,350 B1 | 2/2001 | Okulov et al. | |
| 6,201,174 B1 * | 3/2001 | Eller ........................... | 84/477 R |
| 6,452,081 B1 * | 9/2002 | Ravagni et al. ............. | 84/477 R |
| 6,723,904 B1 | 4/2004 | Dolan et al. | |
| 6,984,780 B2 * | 1/2006 | Reierson ..................... | 84/314 R |
| 7,285,709 B2 | 10/2007 | White et al. | |
| 7,320,643 B1 | 1/2008 | Brosius et al. | |
| 7,323,633 B2 | 1/2008 | Shaffer | |
| D565,093 S | 3/2008 | Chan | |
| 7,381,878 B2 | 6/2008 | Cook | |
| 7,402,746 B2 * | 7/2008 | Saenz ............................ | 84/726 |

(Continued)

OTHER PUBLICATIONS

Yamaha EZ-EG Guitar, printout available online on Jun. 18, 2009, at http://www.yamaha.com/yamahahavgn/CDA/ContentDetail/ModelSeriesDetail.html?CNTID=21546, 2-pages.

(Continued)

*Primary Examiner* — Marlon Fletcher
(74) *Attorney, Agent, or Firm* — The Fletcher Law Firm PLLC; Brian N. Fletcher

(57) ABSTRACT

A self-teaching guitar and entertainment system for use by a user to learn how to play a song on a guitar includes a guitar having a plurality of strings, a fret board having a plurality of illuminatable portions, and a processor operable to illuminate the illuminatable portions of the fret board. The processor and the illuminatable portions are operable to selectively display illuminated fret numbers in the frets and adjacent the strings on the fret board corresponding to fret numbers on strings in a guitar tablature for playing the song.

31 Claims, 18 Drawing Sheets

(56) References Cited

U.S. PATENT DOCUMENTS

| | | |
|---|---|---|
| 7,427,704 B2 | 9/2008 | Huwaldt |
| 7,446,253 B2 * | 11/2008 | Knapp et al. .................... 84/722 |
| 7,504,578 B2 | 3/2009 | Lewry |
| 7,521,619 B2 * | 4/2009 | Salter ......................... 84/477 R |
| 7,589,727 B2 | 9/2009 | Haeker |
| 2002/0178896 A1 * | 12/2002 | George ....................... 84/477 R |
| 2004/0237757 A1 * | 12/2004 | Alling ............................. 84/601 |
| 2005/0172785 A1 | 8/2005 | Fisher-Robbins et al. |
| 2005/0183567 A1 * | 8/2005 | Aoki et al. ..................... 84/722 |
| 2005/0252359 A1 | 11/2005 | Cook |
| 2006/0032362 A1 * | 2/2006 | Reynolds et al. .............. 84/601 |
| 2006/0107826 A1 * | 5/2006 | Knapp et al. .................... 84/724 |
| 2006/0134590 A1 | 6/2006 | Huffman et al. |
| 2007/0051226 A1 | 3/2007 | Diaz |
| 2007/0113720 A1 | 5/2007 | Shaffer |
| 2007/0256540 A1 * | 11/2007 | Salter .......................... 84/485 R |
| 2007/0256551 A1 * | 11/2007 | Knapp et al. .................... 84/722 |
| 2008/0105108 A1 * | 5/2008 | Saenz ......................... 84/485 R |
| 2008/0127808 A1 | 6/2008 | Shaffer |
| 2009/0064849 A1 | 3/2009 | Festejo |
| 2009/0126553 A1 * | 5/2009 | Murray ....................... 84/485 R |
| 2009/0188371 A1 * | 7/2009 | Chiu et al. .................. 84/314 R |
| 2009/0191932 A1 * | 7/2009 | Chiu et al. ........................ 463/7 |
| 2009/0272248 A1 | 11/2009 | Papenfus |
| 2009/0314157 A1 * | 12/2009 | Sullivan .......................... 84/646 |
| 2010/0031804 A1 | 2/2010 | Chevreau et al. |
| 2010/0083807 A1 * | 4/2010 | Sullivan .......................... 84/315 |
| 2010/0083808 A1 * | 4/2010 | Sullivan .......................... 84/315 |
| 2010/0087254 A1 * | 4/2010 | Sullivan ........................... 463/37 |
| 2010/0107849 A1 * | 5/2010 | Shaffer ............................ 84/293 |
| 2010/0122621 A1 * | 5/2010 | Newstetter .................. 84/314 R |
| 2010/0137049 A1 * | 6/2010 | Epstein ............................. 463/7 |
| 2010/0186573 A1 * | 7/2010 | Papenfus .................... 84/314 R |
| 2010/0234109 A1 * | 9/2010 | Chiu et al. ....................... 463/37 |
| 2010/0307319 A1 * | 12/2010 | Kani .......................... 84/485 R |
| 2011/0003638 A1 * | 1/2011 | Lee et al. ......................... 463/35 |
| 2011/0011241 A1 * | 1/2011 | Bartos ........................ 84/485 R |
| 2011/0146476 A1 * | 6/2011 | Zimmerman ............... 84/470 R |
| 2011/0218022 A1 * | 9/2011 | Chiu et al. ......................... 463/7 |
| 2011/0319160 A1 * | 12/2011 | Arn et al. ......................... 463/30 |
| 2012/0064498 A1 * | 3/2012 | Swain ....................... 434/307 R |

OTHER PUBLICATIONS

Fretlight Guitar, available from Optek Music Systems, Inc., Guitar World, p. 174, Feb. 2006.

* cited by examiner

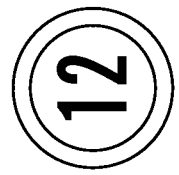
*FIG. 18*
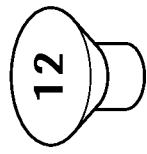
*FIG. 17*
*FIG. 16*

SELF-TEACHING AND ENTERTAINMENT GUITAR SYSTEMS

This application claims the benefit of U.S. Provisional Application No. 61/226,572, filed Jul. 17, 2009, entitled "Self-Teaching And Entertainment Guitar Systems", which is hereby incorporated herein by reference in its entirety.

FIELD OF THE INVENTION

This invention relates generally to guitars, and more specifically, to self-teaching and entertainment guitar systems.

BACKGROUND

As a substitute for reading musical staff notation, it is known for a beginning student to learn to play a guitar by following a printed diagram, know as a guitar tablature, to determine positions to place one's fingers on specific strings and frets corresponding to desired chords or melodic lines to be played.

A limitation of this method of learning to play the guitar is that the use of a guitar tablature is highly visual, awkward and time consuming as the user must repeatedly move his visual attention to the guitar fret board and back to properly position his finger and play the sequence of chords or notes.

Another method of learning to play the guitar is with the guided help of a guitar instructor. The instructor may attempt to teach the student by demonstrating the placement of finger on the strings and frets and guiding the student's hand for proper placement. A limitation of the use of a hired instructor is that instruction can be expensive, cannot be performed independently, and is only available at certain scheduled times.

Method books and instructional videos are available but can be very difficult to comprehend, especially if the person is musically illiterate. Most instructional books and videos require a basic understanding of music notation. For a person that simply wishes to learn to play the guitar and not interested in becoming a professional musician, method books and instructional videos can be difficult to understand, follow, and frustrating to learn from independently.

Therefore, there is a need for self-teaching and entertainment guitar systems.

SUMMARY OF THE INVENTION

In a first aspect, the present invention provides a self-teaching guitar system for use by a user to learn to play a song on a guitar. The self-teaching guitar system includes a guitar having a plurality of strings, and a fret board having a plurality of illuminatable portions, and a processor operable to illuminate the illuminatable portions of the fret board. The processor and the illuminatable portions are operable to selectively display illuminated fret numbers on the frets and adjacent the strings on the fret board corresponding to fret numbers on strings in a guitar tablature for playing the song.

In a second aspect, the present invention provides a computer-implemented method for use by a user in learning to play a guitar having a plurality of strings and a fret board. The computer implemented method includes selectively illuminating fret numbers adjacent the strings on the fret board of the guitar corresponding to strings and fret positions to be engaged by the user when playing a song. The selective illumination of the fret board generally corresponds to fret numbers on strings in a guitar tablature for playing the song.

In a third aspect, the present invention provides at least one program storage device readable by a machine, tangibly embodying at least one program of instructions executable by the machine to perform a method for use by a user in learning to play a guitar having a plurality of strings and a fret board. The method includes selectively illuminating fret numbers adjacent the strings on the fret board of the guitar corresponding to strings and fret positions to be engaged by the user when playing a song. The selective illumination of the fret board generally corresponds to the fret numbers on strings in a guitar tablature for playing the song.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description of various embodiments and the accompanying drawings in which:

FIG. 16 is a perspective view of one of the metal sleeves shown in FIG. 15;

FIG. 17 is a perspective view of one of the numbered fret caps shown in FIG. 15;

FIG. 18 is a top view of another embodiment of a numbered fret cap having a ring such as a brass ring;

DETAILED DESCRIPTION OF THE INVENTION

The present invention is directed to systems and methods for aiding a user in learning to play a guitar. For example, in one aspect, the present invention provides a guitar in which the fret numbers, corresponding to a guitar tablature of a song, are illuminated on the fret board itself. As described in greater detail below, the selectively illuminated lighted numbers show a user what fret and what string from the tablature is needed to be closed. The lighted numbers are desirably dynamic and change with time. For example, should the numbers "15" light up in the fifteenth (15) fret under or adjacent the B string and the high E string, then the user would close the B string and high E string with his fingers to ring out those notes of the song. Then, if the number "22" lights up under or adjacent the D string then the user would close the D string in the twenty-second (22) fret to ring out the note. The illuminated numbers on the fret board show where and which strings the user needs to engage. The length of time that the illuminated fret numbers are illuminated may be used to indicate the length of time that the notes are to be played. In this aspect of the invention, the numbers do not instruct the user which of his fingers he or she is to use. The present invention may provide an easier way for the user to learn and see how a guitar is to be played to play songs on the guitar. The user may play at his/hers own time and may need not have to worry about being embarrassed because he/she cannot play like an instructor.

Figure 1:
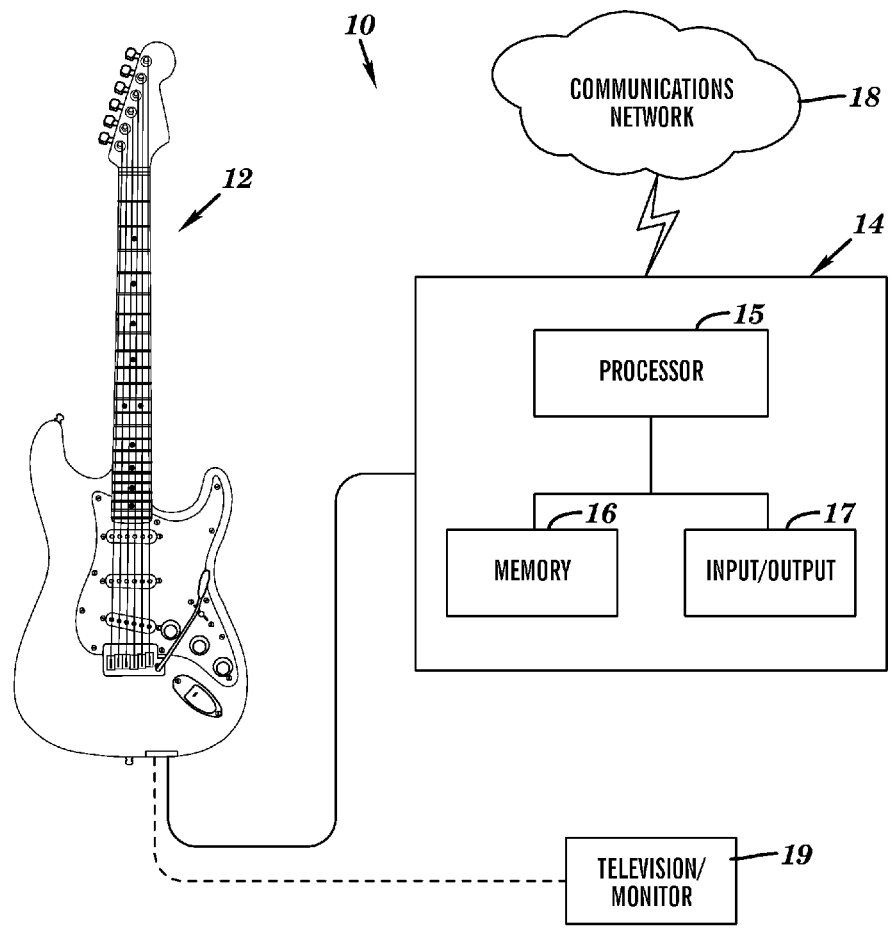
FIG. 1 is a diagrammatic illustration of one embodiment of a self-teaching and entertainment guitar system in accordance with an aspect of the present invention.
Figure 2:
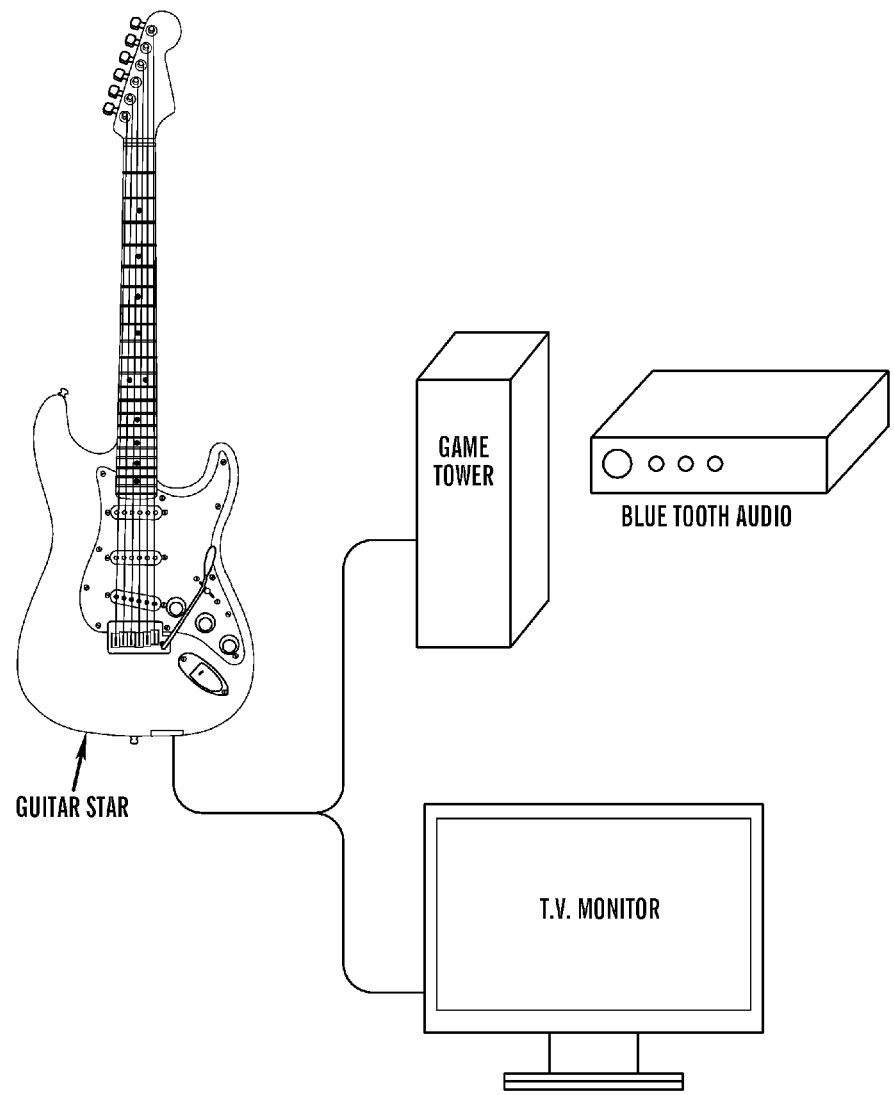
FIG. 2 is a diagrammatic illustration of another embodiment of a self-teaching and entertainment guitar system in accordance with an aspect of the present invention.

FIG. 1 is a block diagram of one embodiment of a self-teaching and entertainment guitar system 10 in accordance with an aspect of the present invention. System 10 generally includes a guitar 12, a computing unit 14 which may include a processor 15, a memory 16 such as a hard drive, flash drive, or other memory means, and one or more input/output devices 17 such as a monitor or a display screen, a keyboard, a mouse, and one or more speakers, which are operably connected together. While the components may be operably connected via wires, it will be appreciated that the components may be wirelessly connected. The system may also be operably connected to a communications network 18 such as the Internet, or to other devices, or systems. In another embodiment, guitar 12 may include the computing unit disposed in the guitar and the guitar may also be connectable to a communications network, or to a television or monitor 19, or a cable box which is connectable to a broadcast service. FIG. 2 illustrates another embodiment of a self-teaching and entertainment guitar system in accordance with another aspect of the present invention.

Figure 3:
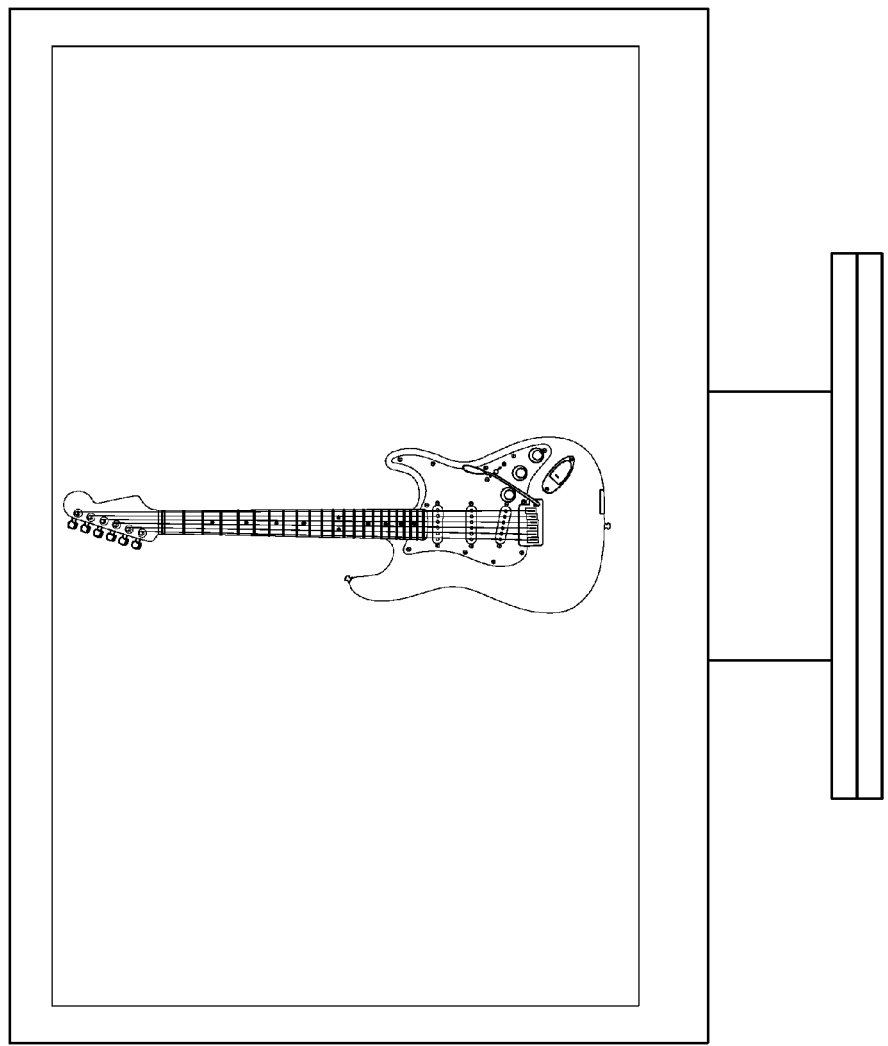
FIGS. 3-5 illustrate one embodiment of initial screen displays when turning on the self-teaching and entertainment guitar systems of FIGS. 1 and 2.
Figure 4:
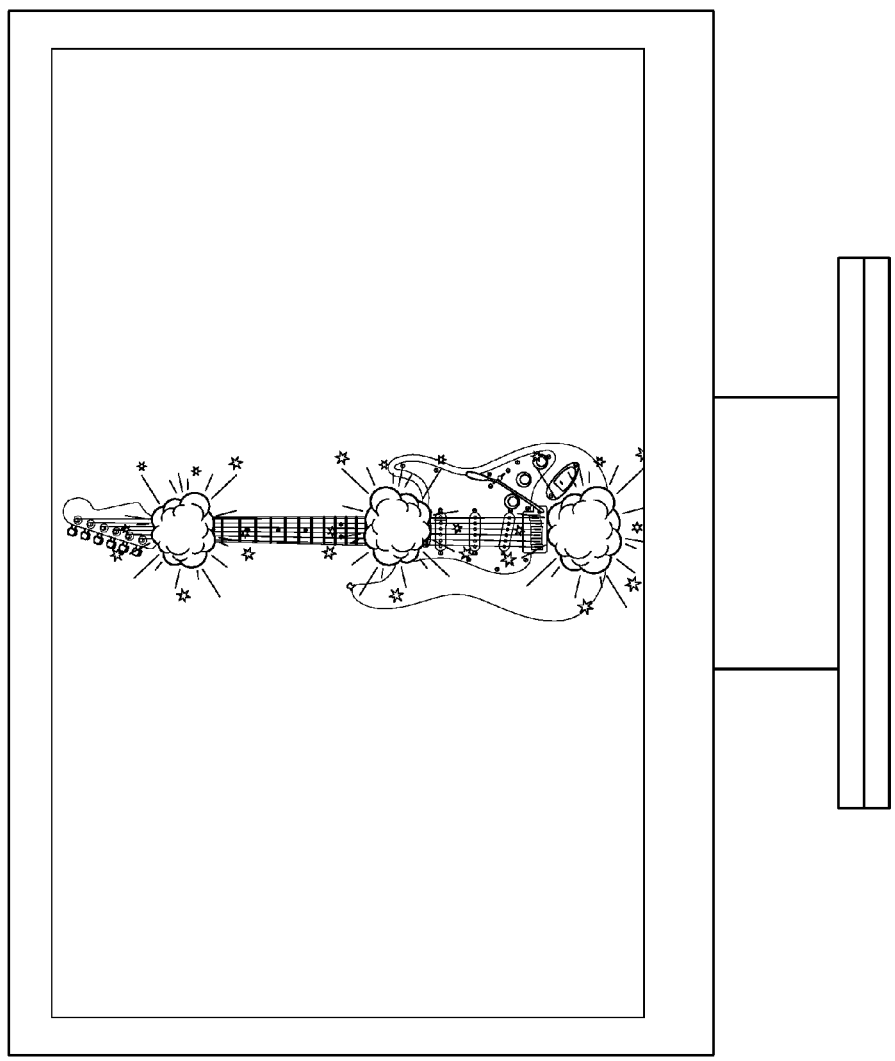
Figure 5:
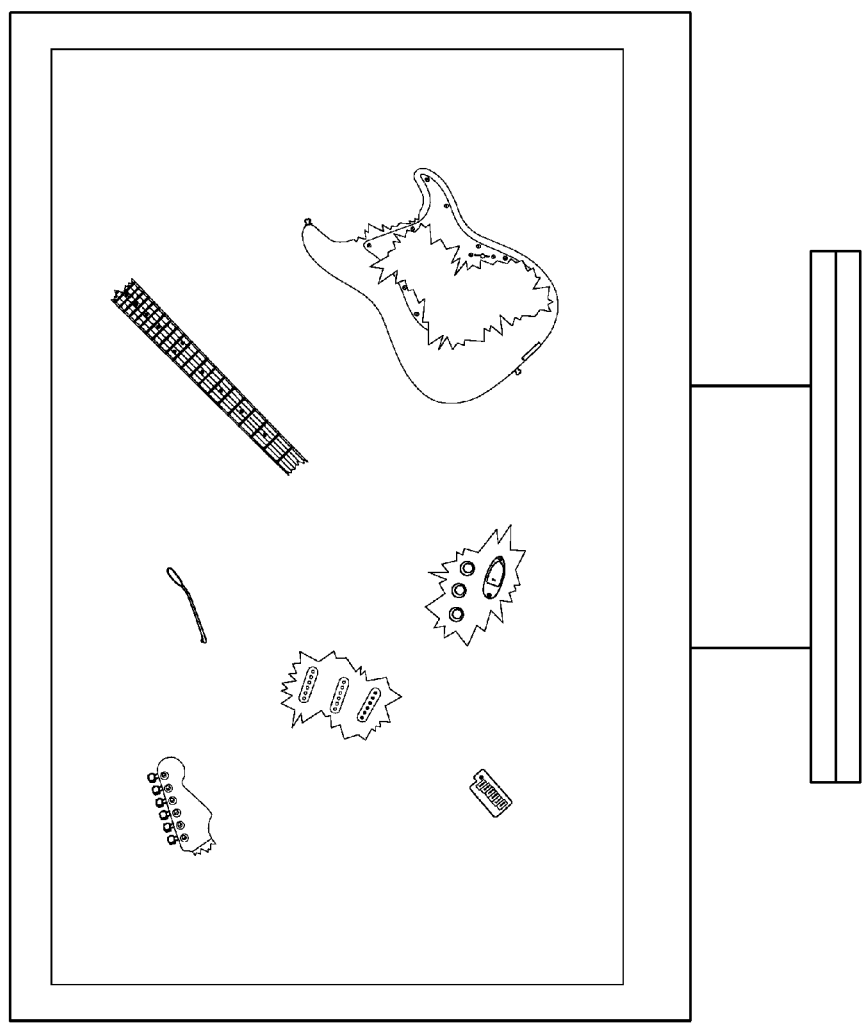

FIGS. 3-5 illustrate one embodiment of a dynamic screen sequence when initially turning on the system. For example, particularly for beginning students learning to play a guitar, when a user initially turns on the system, the system may be operably programmed to display an image of the guitar on the monitor as shown in FIG. 3, which then explodes as shown in FIG. 4, resulting in a plurality of spaced-apart guitar pieces as shown in FIG. 5. The system may be operably programmed so that a beginning student may, using a mouse and curser displayed on the screen, reassemble the guitar before beginning a guitar lesson. In addition, as the beginning student may click on and move the pieces of the guitar back together, the name of the part of the guitar may be displayed or sounded, as well as providing information regarding the different parts of the guitar. Other suitable interactive teaching and learning software programs may be incorporated into aspects of the present invention.

Figure 6:
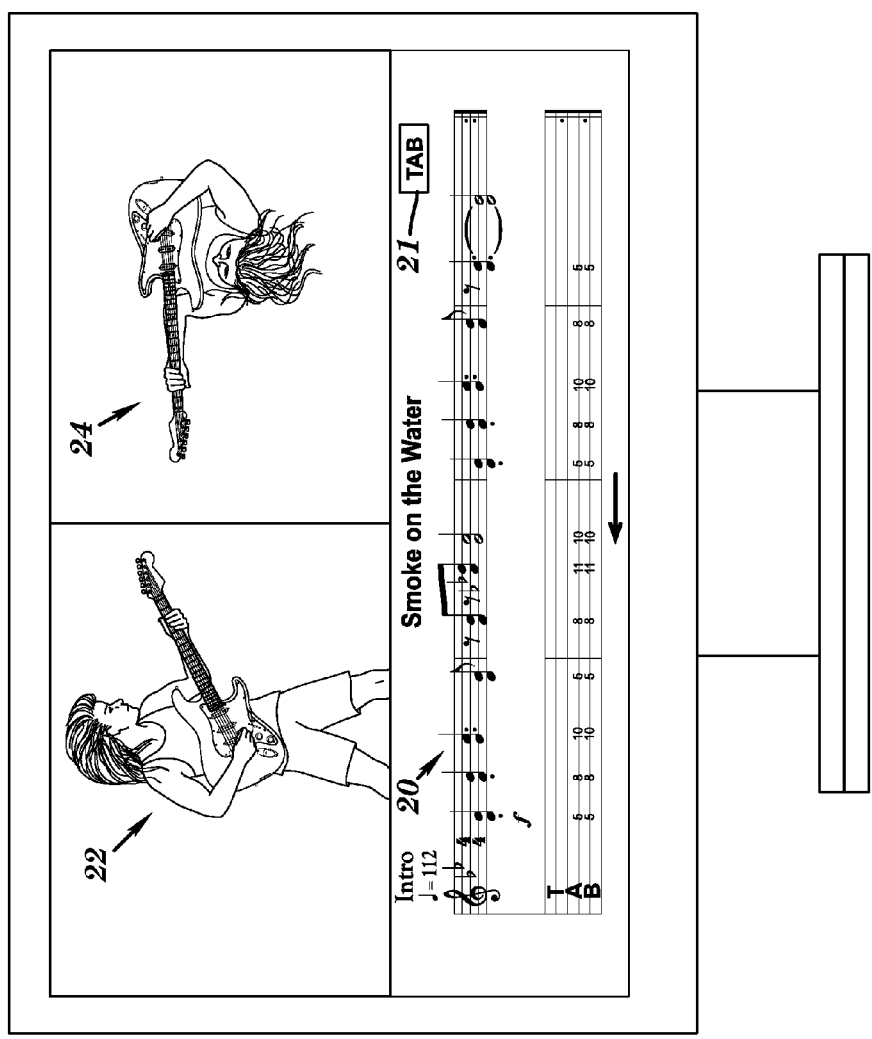
FIG. 6 is one embodiment of a screen display of the self-teaching and entertainment guitar system of FIGS. 1 and 2, in which the screen includes a running tab along the bottom, a computer-generated front view of a guitarist playing a guitar corresponding to the running tab, and a computer-generated over the shoulder view of the guitarist playing a guitar corresponding to the running tab.
Figure 7:
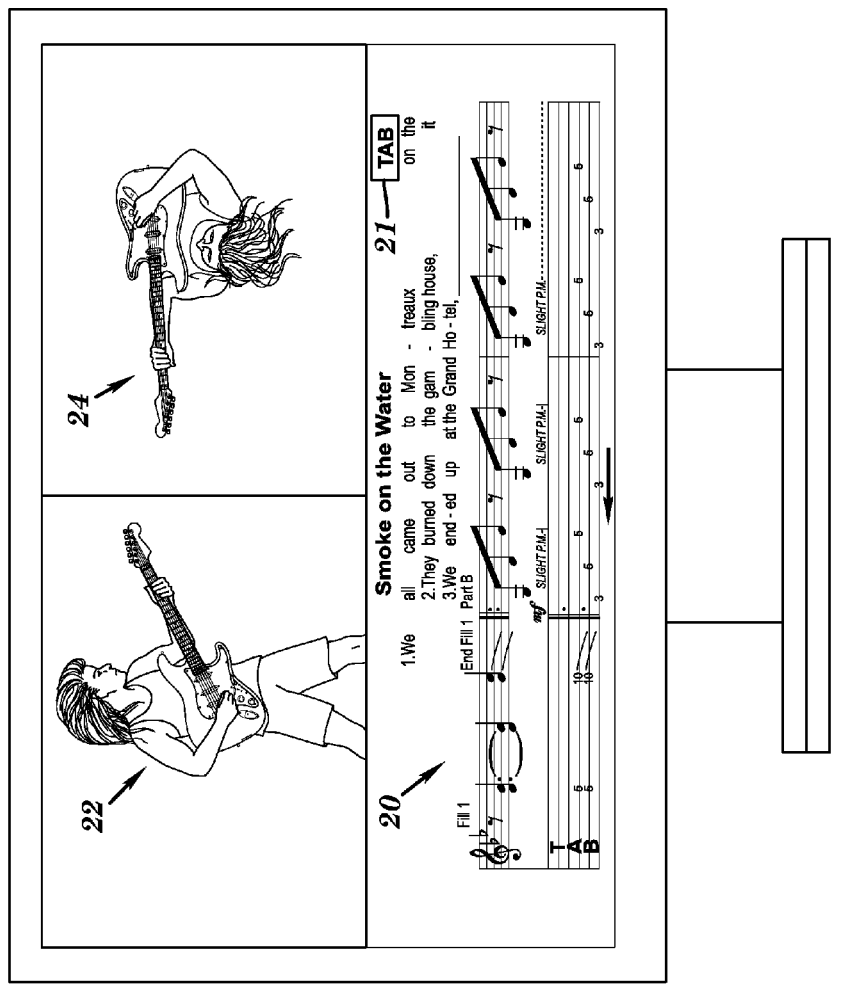
FIG. 7 is a second embodiment of a screen display of the self-teaching and entertainment guitar system of FIGS. 1 and 2, in which the screen includes a running tab, sheet music treble clef, and words or lyrics along the bottom, a computer-generated front view of the guitarist playing a guitar corresponding to the running tab, and a computer-generated an over the shoulder view of the guitarist playing a guitar corresponding to the running tab.

As show in FIGS. 6 and 7, for practicing, the display may be divided into a plurality of sections. For example, the display may be divided into three sections. A tablature section 20 may occupy about 50-percent of the screen from the bottom to halfway up the screen with the programmed tablature moving from left to right as the song is played. The tablature section may include running standard musical note notations such as sheet music treble clef, guitar tablature with note for note transcriptions, and words or lyrics.

The other about 50-percent of the screen may be split into two sections, each occupying about 25-percent of the screen. On the left side 22 of the screen may be a view of a guitar player such as a computer-generated view of a guitar player playing the programmed tablature. On the right side 24 of the screen may be an over the shoulder view of a guitar player such as a computer generated guitar player playing the programmed tablature. This view corresponds to the view the user would have in looking down at the guitar when practicing. The computer may be operable programmed so that a user can adjust or vary the angle of view observed on the screen for the different views such as the over the shoulder view. The string and location of the fret positions may also be illuminated in sections 22 and 24 along with the illumination of the strings and fret board of the guitar itself when practicing a song. A multitude of special effects may be programmed when the user is practicing or playing a game as described below in greater detail.

With regard to FIGS. 6 and 7, a TAB button 21 may be provided and located adjacent the moving tablature in the top right corner of section 20. This will allow the user to access a list or a video of the tablature explanation should they click on to the TAB button and provided with definitions for special guitar notation. For example, a photo and a word description of the guitar notation may be provided for bend, vibrato, trill, tremolo bar, rhythm slashes-single notes, artificial harmonic, pull-off, unison bend, pre-bend and release, hammer-on, natural harmonic, rhythm slashes, pre-bend, slide, tremolo picking, muffled strings, pick slide, slide, bend and release, wide or exaggerated vibrato and tapping.

Figure 8:
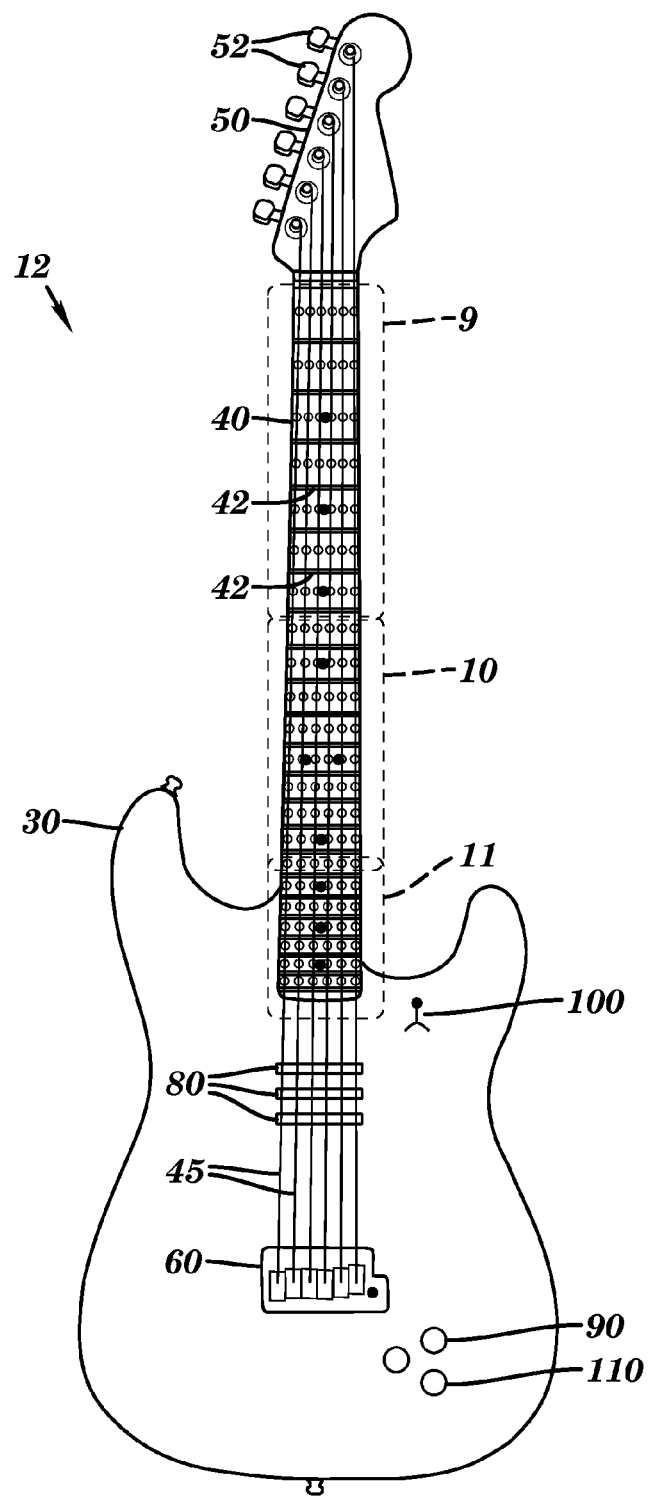
FIG. 8 is an enlarged view of the guitar of the self-teaching and entertainment guitar system of FIGS. 1 and 2.
Figure 9:
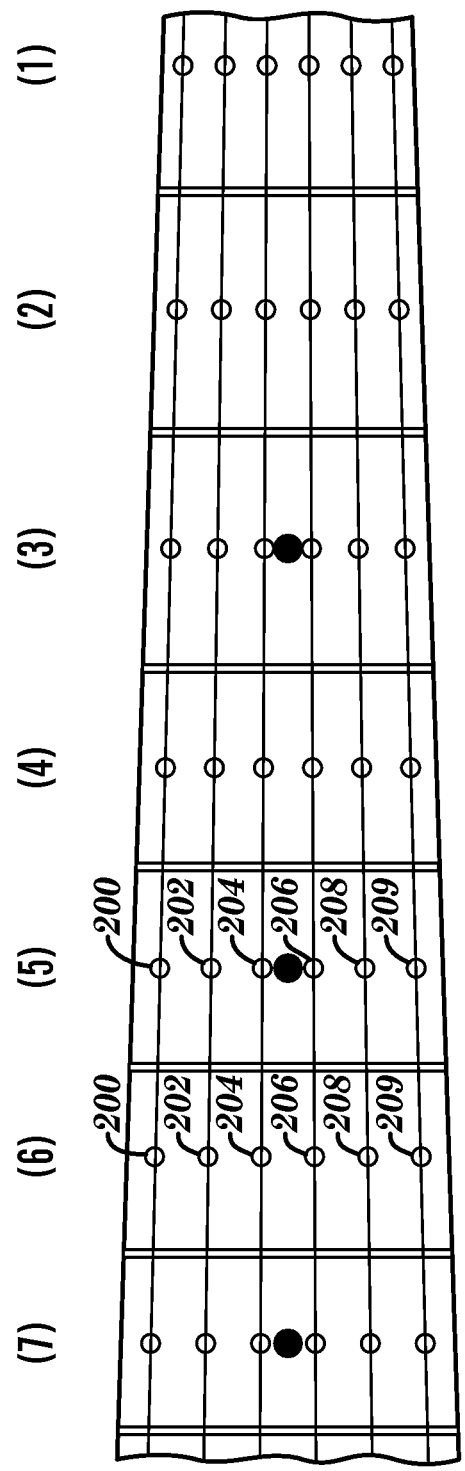
FIG. 9 is a front view of the neck of the guitar of FIG. 8 showing frets 1 through 7.
Figure 10:
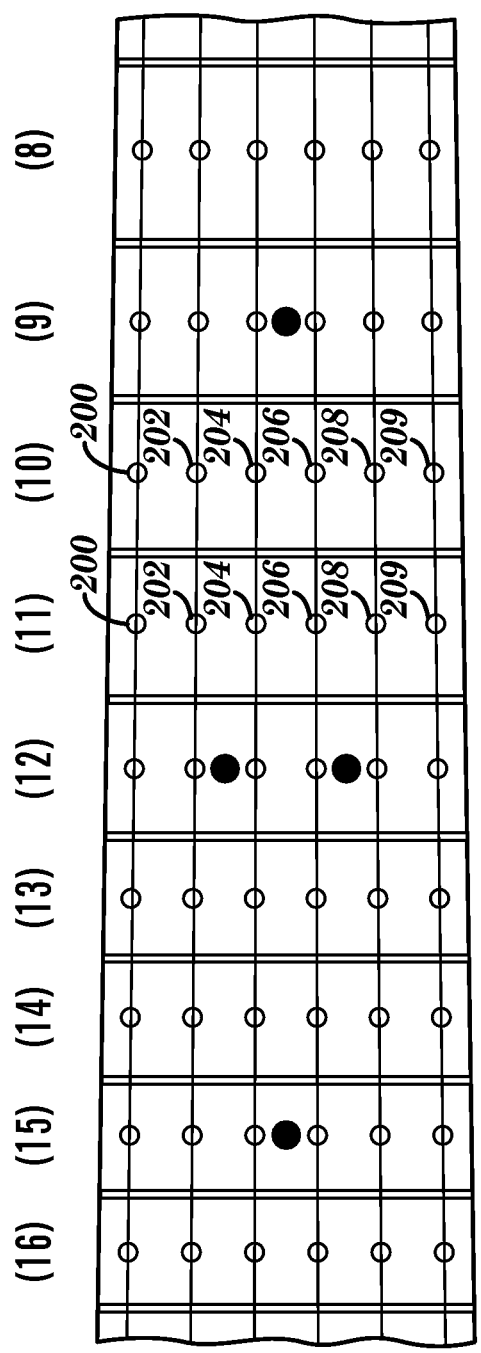
FIG. 10 is a front view of the neck of the guitar of FIG. 8 showing frets 8 through 16.
Figure 11:
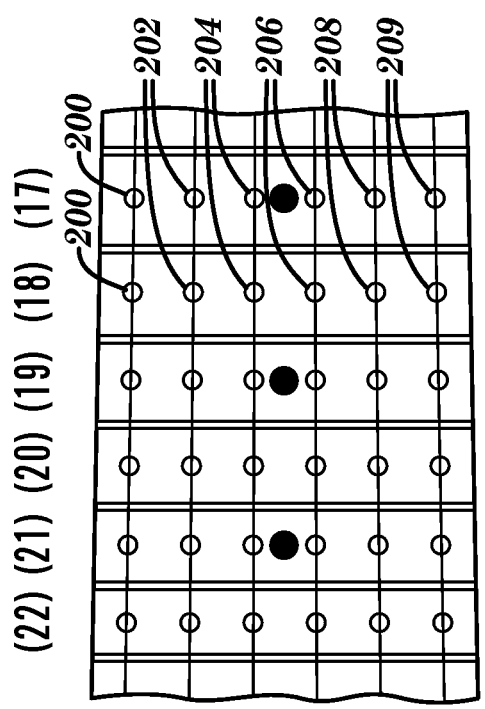
FIG. 11 is a front view of the neck of the guitar of FIG. 8 showing frets 17 through 22.

FIG. 8 is an enlarged elevational view of guitar 12 which may include a body 30, an elongated neck 40 having a plurality of raised metal frets 42 secured to the body, a head stock 50 secured to an end of the neck, and a bridge 60 secured to the body. Head stock 50 includes six adjustable machine heads or tuning pegs 52 which tension and adjust the tension of a plurality of strings 45 disposed between the bridge and the head stock nut, and thus, the pitch of the strings. The guitar body may include one or more electronic pickups 80 disposed under the strings, one or more volume controls 90, a pickup selector 100, and a tone control 110. Video special effects may be disposed on the front and back of the guitar and the head stock of the guitar. Other pickups, packup selectors, and controls may be suitably employed FIGS. 9-11 illustrate one embodiment of a neck of a guitar in accordance with one aspect of the present invention. For example, FIG. 9 is an enlarged illustration of frets 1 through 7, FIG. 10 is an enlarged illustration of frets 8 through 16, and FIG. 11 is an enlarged illustration of frets 17 through 22. The guitar of the present invention may include a fret board which illuminates to show the player which string(s) and fret(s) to be engaged to play particular note(s) or chord(s), similar to the image of a standard or conventional guitar tablature. Tablature (or tabulature, or tab for short) is a form of musical notation indicating instrument fingering rather than musical pitches. Tablature is more easily read by a novice fretted string musician than standard notation. After tuning the instrument, the user places one's fingers on the indicated string and fret, and sound the note.

With reference to FIGS. 9-11, under the low E string are a plurality of illuminable portions 200, under the A string are a plurality of illuminable portions 202, under the D string are a plurality of illuminable portions 204, under the G string are a plurality of illuminable portions 206, under the B string are a plurality of illuminable portions 208, and under the high E string are a plurality of illuminable portions 209.

Figure 12:
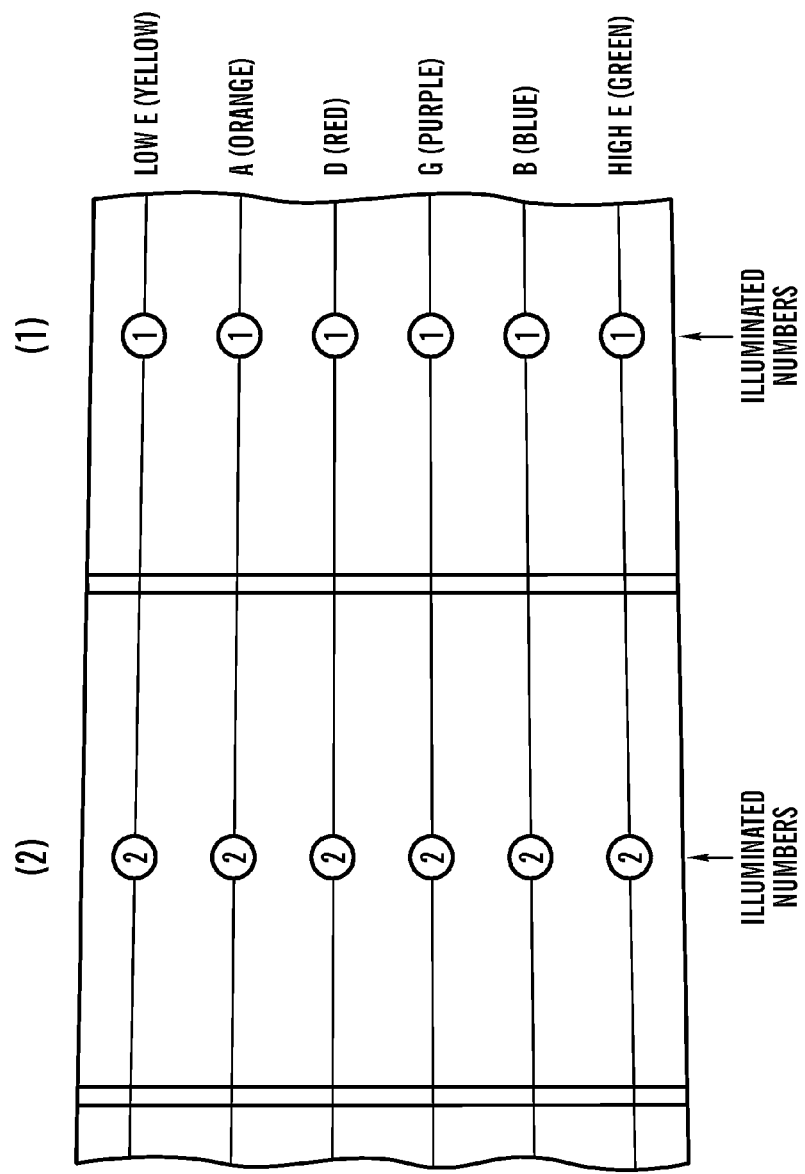
FIGS. 12 and 13 are enlarged views of a portion of the fret board of the guitar of FIG. 8.
Figure 13:
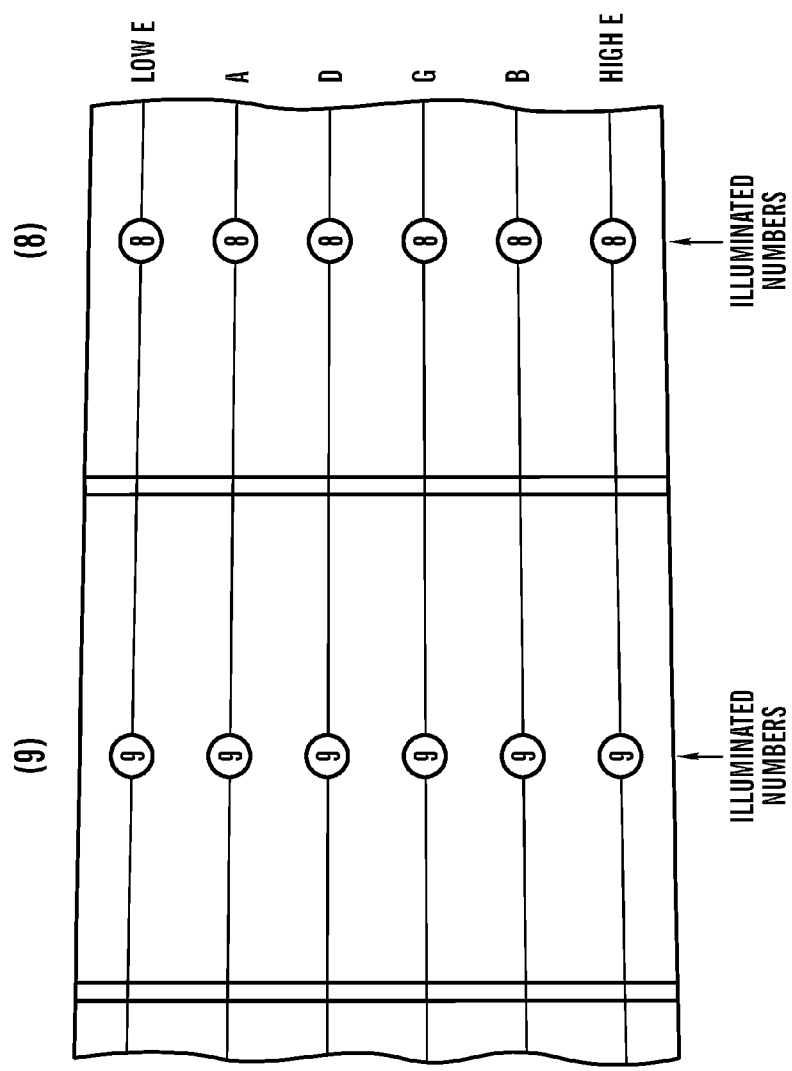

As best shown in FIGS. 12 and 13, each of the sixth illuminated portions in each fret may include the number of that fret. For example, FIG. 12 illustrates frets 1 and 2 having the illuminable numbers "1" in fret 1, and the illuminable numbers "2" in a fret 2. For example, FIG. 13 illustrates frets 8 and 9 having the illuminable numbers "8" in fret 8, and the illuminable numbers "9" in a fret 9.

Figure 14:
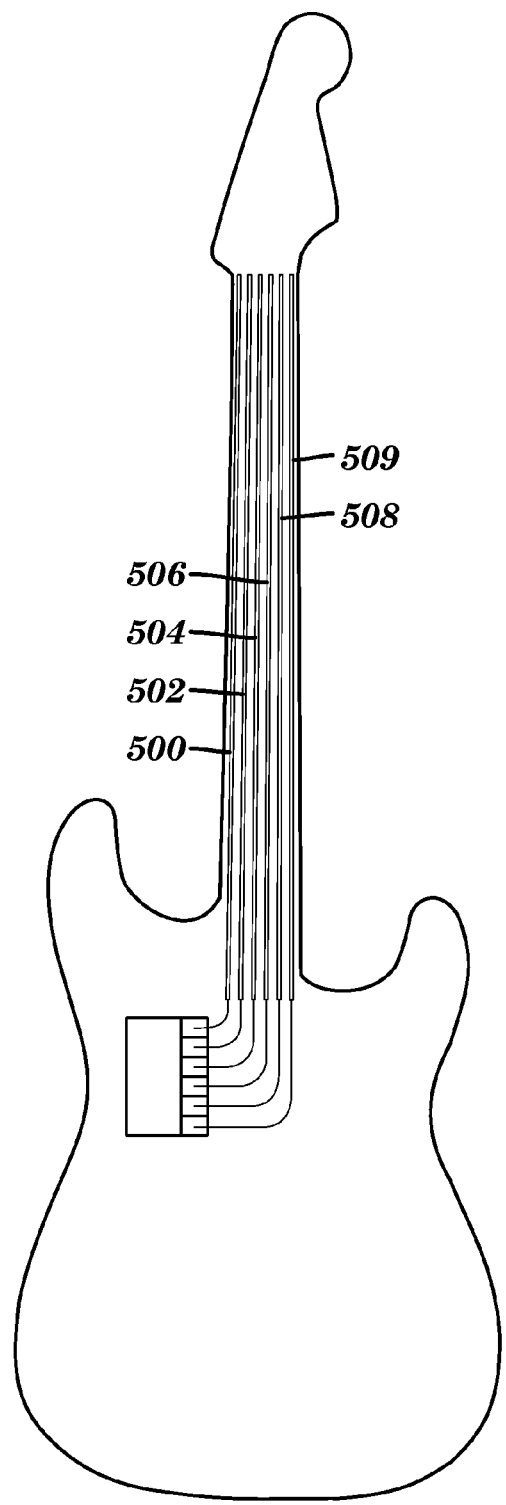
FIG. 14 is a front elevational view of the one embodiment of the guitar of FIG. 1 with the fret board removed to show light strips operable for illumining the illuminable portions of the fret board.
Figure 15:
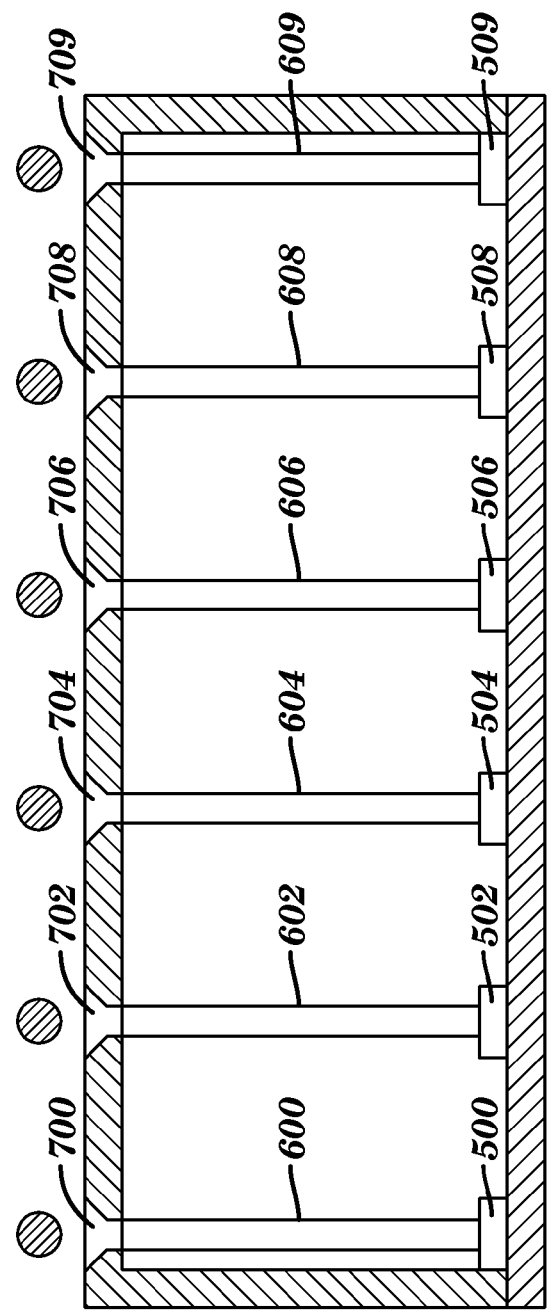
FIG. 15 is a cross-sectional view of the fret board illustrating the lighted strips, sleeves, and fret caps for illuminating the fret board.

With reference to FIGS. 14 and 15, the numbered illuminated portions may be illuminated from under the fret board. Initially, with reference to FIG. 14, the guitar may include a plurality of light strips for illuminating the illuminable portions of the neck. For example, light strip 500 may be disposed under the fret board and adjacent to or under the low E string, light strip 502 may be disposed under the fret board and adjacent to or under the A string, light strip 504 may be disposed under the fret board and adjacent to or under the D string, light strip 506 may be disposed under the fret board and adjacent to or under the G string, light strip 508 may be disposed under the fret board and adjacent to or under the B string, and light strip 509 may be disposed under the fret board and adjacent to or under the high E string.

FIG. 15 is a cross-sectional view of one embodiment of a fret board illustrating the lighted strips 500, 502, 504, 506, 508, and 509, metal sleeves 600, 602, 604, 606, 608, and 609, and numbered fret caps 700, 702, 704, 706, 708, and 709 for illuminating the fret board.

For example, the light strips may be disposed under or along the bottom of the fret board. Extending upwardly from the light strips are metal sleeves, one of which shown in FIG. 16. Along the top of the fret board under the strings or adjacent to the strings are the numbered caps. In operation, light from the light strips travel upwardly through the metal sleeves to the numbered fret caps. As best shown in FIGS. 17 and 18, the numbered fret caps may be formed from a clear glass or plastic material and include a number disposed thereon, e.g., printed on in black or a colored ink. The lighted strip may provide the color for the different colors for the strings. In another embodiment, the fret caps may be colored glass or plastic and numbered, and the lighted glass strips may produce a generally white light. As shown in FIG. 18 a numbered fret cap may have a ring such as a brass ring disposed around the clear or plastic material. Each light strip may comprises a plurality of separately illuminatable lights such as LEDs which may be multiplexed to illuminate the various frets and fret numbers corresponding to playing the song on the guitar. It will be appreciated by those skilled in the art that other means for illuminating the fret board may be suitably employed, For example, fiber optics, or an LCD panel may be suitably employed. It will be appreciated that the fret caps need not have the number disposed thereon, provided the light strips or other lighting means is operable to produce the number, either lighted numbers or silhouetted numbers.

When an open string is to be played, in one embodiment, all the fret caps under or adjacent the open string to be played may be illuminated. For example, if the high E string is to be played in the tablature, then all lights under the high E-string may be illuminated. Other means for illustrating playing an open string may be suitably employed.

The illuminated fret numbers for each string may also be coordinated to illuminate the same color. For example, each light strip may have the same color, or the number fret caps may comprising a colored glass or plastic. For example, the low E string may be yellow, the A string may be orange, the D string may be red, the G string may be purple, the B string may be blue, and the high E string may be green. Other possible colors or color combinations may be suitably used for the light strip or the fret caps. In addition, the computing unit and light strips may allow the user to select his/hers color scheme by selecting from a color chart.

From the present description, it will be appreciated by those skilled in the art that other means for illuminating the numbered frets and for identifying when an open string is to be played. For example, an outer portion without the number of the illuminable portion may be used to illustrate an open string. Separate LEDs may be used for each numbered fret. The light strips or LEDs may be imbedded along the top of the fret board. Optical fibers and other suitable means for providing numbered fret numbers may be suitable employed in accordance with the present invention. It will also be appreciated that not all of the frets need be illuminated as described above. For example, it is possible that only the first 6 or 7 frets of the fret board may be provided with the illuminatable portions described above, for aiding a beginner in learning to play the guitar.

The illuminated numbered frets may be disposed adjacent to the string, for example under, above, or below the string when looking down from the top of the neck. In addition, the numbed frets may be disposed in the middle of the fret or offset toward the front or back of the fret. For example, by disposing the numbered frets toward the back of the fret, the user may be able to contact the string adjacent the raised metal fret and still be able to see the illuminated fret number.

Figure 19:
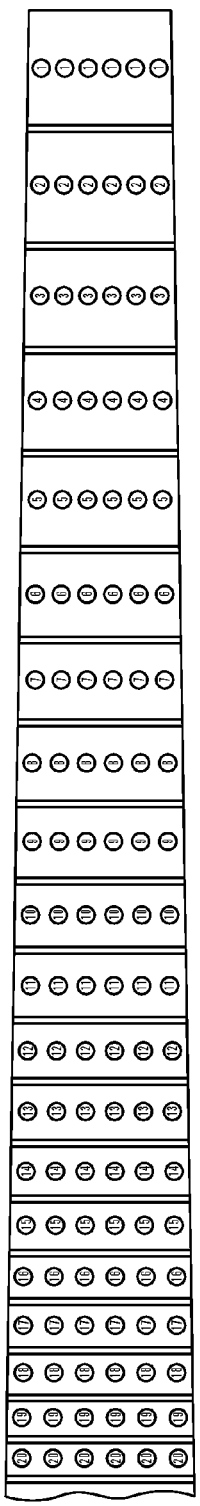
FIG. 19 is a front elevational view of one embodiment of a fret board in accordance of with the present invention.
Figure 20:
FIG. 20 is a side elevational view of the fret board of FIG. 19.
Figure 21:
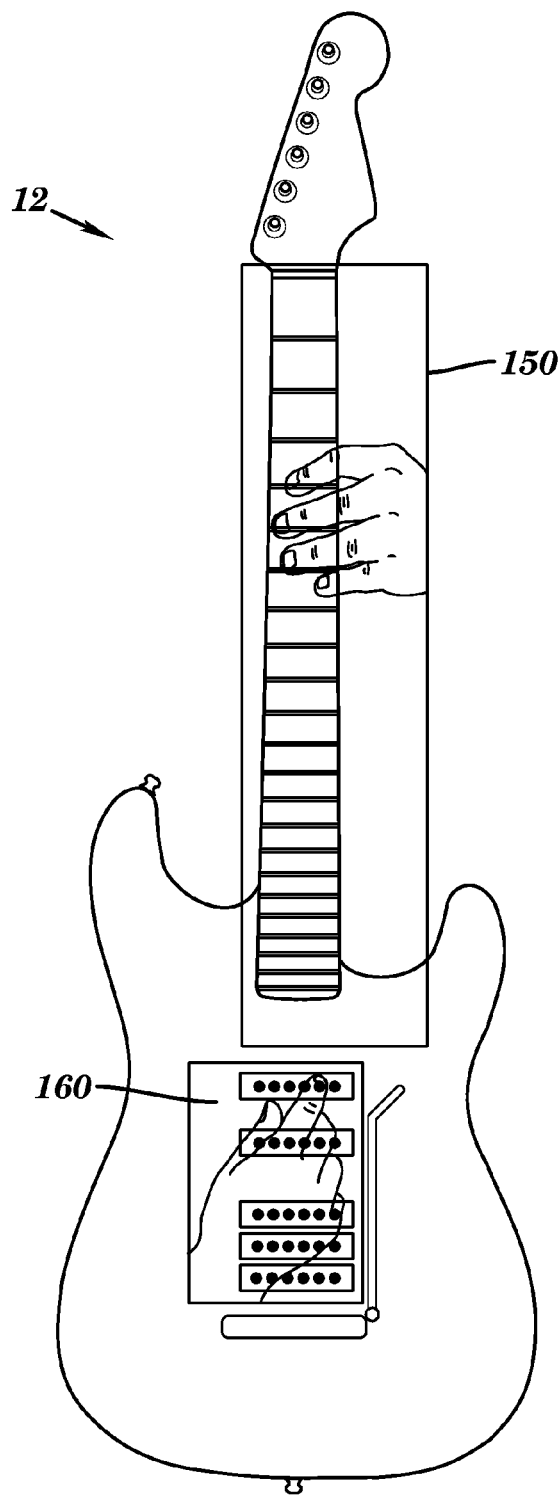
FIG. 21 is a front elevational view of the guitar of FIG. 1 having holographic or other display panels in accordance with another aspect of the present invention.

As shown in FIGS. 19 and 20, one aspect of the present invention may include the ornamental appearance of the numbered fret board. It will be appreciated that the numbers may be oriented as shown inverted, or flipped, or rotated, depending on whether the strings of the guitar are strung for playing right handed or left handed.

Various components for implementing aspects of the present invention, e.g., processor, memory files, interface connectors, audio format, computer logic, tuning etc. are described in U.S. Pat. No. 7,402,746 issued to Saenz, the entire contents of which are incorporated herein by reference.

Practicing Mode

As described, guitar 12 may include a lighted fret board, that will light up to show the user what strings and what frets must be closed to ring out desired notes of song. The illuminated fret board may be used in combination with sections 22 and 24 of FIGS. 6 and 7, which shows the user the finger placements and which specific fingers to use. In addition, sections 22 and 24 may be programmed to provide lessons, e.g., where the computer-generated guitarist provides initial lessons for slowly walking or guiding the user through an initial introduction for playing the lead, chords, etc. The lessons may include voice as well as visual effects. In addition, the computer-generated guitarist may speak to the user and provide encouragement and other motivational effects.

In one aspect of the invention, when a song is played back, the fret board is illuminated in programmed sequence at the precise times and areas along the guitar neck that a guitarist would place his fingers during a song. It is the player's challenge to use any finger he/she desires to keep up with the proper finger placement and match it as best that they can to successfully play the song. Through repeated playing, the player may eventually be able to play the song, which may include the cords and the "riffs" of a lead guitar. Because of the wide range of players' abilities, the stored songs may be configured for beginners, as well as the songs may be configured for more experienced players. In addition, the playback of the song may be at full speed, or be variably adjustable by the user to be played at other speeds such as at half speed.

When a song is played, the frets illuminate in a preprogrammed sequence to the notes at the precise times and areas along the fret board, to the rhythm, and displayed on the running tablature with note for note transcriptions. The displayed computer-generated guitarist may also playing right along with the song with fret numbers indication. It is the player's choice to keep up with the finger placement while watching the fret illumination.

Color Scheme of Electric Fret Illumination Panel Light Strips

As described above, the color scheme of the illuminated portions of the fret board may be as follows. The illuminated portions for the low E string may be yellow, the illuminated portions for the A string may be orange, the illuminated portions for the D string may be red, the illuminated portions for the G string may be purple, the illuminated portions for the B string may be blue, and the illuminated portions for the high E string may be green. The fret illumination strips may also be in the desired color. The metal sleeves may also be in the desired colors, and the numbered fret caps may also be in the desired colors for each string.

Monitoring Of Playing

In the above aspects, the guitar system may be operable for determining whether the player is correctly playing the song. For example, with the guitar's strings in tune, the processor may be programmed for monitoring the pitch of the strings from the pickups when played to determine the frequency of the plucked string or strings due to the player placing his finger on the string against the fret board. The detected frequency of the plucked string may be compared to a predetermined frequency in the computing unit for the note played when playing a song. The processor may report the success or failure on the display screen of the player's ability to follow along with the playing of a song. Where the player fails to correctly play a song, the song may be made to automatically repeat that section where the player is having difficulty.

Music Tracks

In another embodiment, the music may be stored and divided into different tracks, i.e., drums, bass, lead, rhythm, vocals, etc. for selection by the user playback. For example, while practicing, the user can select to play back the tracks without the lead so that the user can play the guitar hearing the other parts of the song and play the lead him/herself. The computer can be programmed to monitor the playing of the lead by the user.

Game Mode

Guitar 12 may also include a game mode, which allows individuals to play games. This provides a challenging activity and fun diversion from practice. For example, the monitoring and entertainment may be implemented in a similar manner in comparing the players actions with the music, e.g., such as disclosed in U.S. Pat. No. 7,320,643 issued to Brosius et al., the entire subject matter being incorporated herein by reference. The monitoring of the player's guitar playing of the strings may be used to provide rewards to the player.

Auto Mode

In an auto mode, the guitar may have added ability to be a stand-alone tutorial or entertainment center.

For example, in using the guitar, a player may select the desired tutorial program, lessons, song, etc., from the processor. The processor would then activate the lighted panels and/or numbers on the fret board in groups and/or sequences to indicate different types of cord, scale, or lead fingerings. The user would then watch the fret-board and his fingers with the group of sequence of numbers that are activated within the frets.

By displaying the proper string and positions on the instrument itself, a beginner or intermediate guitarist may quickly learn proper finger placement. The lighted numbers on the fret board would allow a player to see where to position his/hers fingers when forming chords and scales, as well as how his/hers fingers should move when changing chords, fingering scales, or performing other such techniques on the instrument.

Ultimately, this would enable the player to learn the instrument at his/hers pace and without the instruction of a private teacher. In turn, this would allow the player to practice and learn at his or her own convenience. It would also spare the user and/or his/her parents the cost associated with private lessons. Furthermore, a player can concentrate intently when practicing, as the lighted numbers on the fret board and strings would indicate changing positions directly on the instrument. This would eliminate the need for the player to look at a book, magazine, or chart and then look back to the instrument's neck.

The player may simply view the instrument and also have the option of looking at the monitor to see the computer-generated guitarist play, as well as the moving tablature, which would allow for more consistent and continual practice when learning scales, chords, songs, etc. In turn, this may help speed up the learning process, which in turn may build confidence and make learning to play the guitar a more enjoyable process.

Illuminated/Display Screen Body

Guitar 12 may include a body that illuminates and may include a multitude of digital special effects that go along with the song or game as the player completes the levels that are programmed into the digital processor. This would give the instrument a striking appearance as the player plays in a variety of modes and tempos.

For example, the front of the body may be a LCD or other display screen operably connected to the processor for displaying digital effects and other images. The sides of the body as well as the back may illuminate and include a LCD or other display screen.

Holographic/Display Version

As shown in FIG. 18, a holographic or other display panels 150 and 160 may be attachable along the front of the guitar, and attachable, e.g., via wires or wireless, to the computing unit. The holographic or other display panels may display a set of hands playing the instrument along the sound of the song. The guitar may also feature a multitude of special effects. For example, the entire body may be filled with optical fibers and computer effects from strobe lights to a smoke machine that releases smoke to the beat of a song.

As described above, the present invention provides a musical instrument playing system for a stringed musical instrument. Video instructed tablature with note-for note transcriptions, lyrics of programmed songs, a guitar notation legend may also be noted in a video game that transpires as game progresses. The fret board may have numbers in each fret and under or adjacent each string. The color spectrum of colors may also be involved with coordinating and identifying the numbers of the guitar tablature. The system may comprise stringed musical instruments, lead guitar, rhythm guitar, bass guitar, game tower, television and/or computer monitor, blue tooth audio, a computer-generated guitarist with front views as well as over the shoulder views, as well as note-for-note transcriptions of tablature in video game.

In using the guitar, a player would select the desired tutorial program, lesson, song, etc., from the processor. The processor would then activate the lighted panels and/or numbers on the fret board in groups and/or sequences to indicate different types of cord, scale, or lead fingerings. The user would then watch the fret-board and match his fingers with the group or sequence of letters that were activated within the frets.

By displaying the proper strings and positions on the instrument itself, a beginner or intermediate guitarist quickly learns proper placement for his fingers. The lighted numbers on the freeboard would allow a player to see where to position his/her fingers when forming chords and scales, as well as how his/hers fingers should move when changing chords, fingering scales, or performing other such techniques on the instrument.

The neck of the guitar may be a metal neck so a truss rod may not be needed to keep the neck from bowing. Providing a metal neck may reduce the likelihood that the neck bows and shorts out the string and fret indication lighting system.

Thus, while various embodiments of the present invention have been illustrated and described, it will be appreciated by those skilled in the art that many changes and modifications may be made thereunto without departing from the spirit and scope of the invention.

The invention claimed is:

1. A self-teaching guitar system for use by a user to learn to play a song on a guitar, the self-teaching guitar system comprising:
   a guitar having a plurality of strings, and a fret board having a plurality of illuminatable portions; and
   a processor operable to illuminate said illuminatable portions of the fret board; and
   wherein said processor and said illuminatable portions are operable to selectively display illuminated fret numbers on the frets and adjacent said strings on said fret board corresponding to fret numbers on strings in a guitar tablature for playing the song, and
   wherein each illuminated fret number corresponds to a string and a fret to show the user which string and fret to be engaged to play a particular note or chord.

2. The self-teaching guitar system of claim 1 wherein said illuminable portions of one of said frets of said fret board comprises six illuminable portions adjacent said strings, each of said six illuminatable portions comprising the same number corresponding to the number of the fret.

3. The self-teaching guitar system of claim 1 wherein said processor is operable to illuminate the illuminatable portions for lengths of time corresponding to the lengths of time that the notes are to be played.

4. The self-teaching guitar system of claim 1 wherein said processor is operable to simultaneously display on a display a running tab of a song corresponding to the illuminated frets on the fret board.

5. The self-teaching guitar system of claim 4 wherein said illuminatable portions of the fret board for each string is color coordinated to the color of the strings on the running tab.

6. The self-teaching guitar system of claim 1 wherein said processor is operable to simultaneously display on a display at least one of a front view of a guitarist playing the song, and an over the shoulder view of a guitarist playing the song.

7. The self-teaching guitar system of claim 1 wherein said processor is operable to illuminate a plurality of fret numbers corresponding to a same string to indicate playing the open string.

8. The self-teaching guitar system of claim 1 wherein said processor is operable to monitor the playing of the strings of the guitar by the user in real-time when playing a song illuminated on the fret board.

9. The self-teaching guitar system of claim 8 wherein said processor is operable to indicate an accuracy of the user playing the song.

10. The self-teaching guitar system of claim 1 wherein said guitar comprises a plurality of light strips disposed in the guitar.

11. The self-teaching guitar system of claim 10 wherein said fret board comprises a plurality of holes disposed adjacent each string in each fret.

12. The self-teaching guitar system of claim 11 wherein said fret board comprises a plurality of sleeves disposed in the holes through which the light from the light strips travel.

13. The self-teaching guitar system of claim 1 wherein said fret board comprises a plurality of numbered fret caps.

14. The self-teaching guitar system of claim 1 wherein said guitar comprises at least one of a body and a head stock having a display for displaying digital special effects.

15. The self-teaching guitar system of claim 1 further comprising holographic display panels disposable over said fret board of said guitar.

16. A computer-implemented method for use by a user in learning to play a guitar having a plurality of strings and a fret board, the computer implemented method comprising:
   selectively illuminating fret numbers adjacent the strings on the fret board of the guitar corresponding to strings and fret positions to be engaged by the user when playing a song; and
   wherein the selective illumination of the fret board generally corresponds to fret numbers on strings in a guitar tablature for playing the song, and
   wherein each illuminated fret number corresponds to a string and a fret to show the user which string and fret to be engaged to play a particular note or chord.

17. The computer-implemented method of claim 16 wherein one of the frets of the fret board comprises six illuminable portions adjacent the strings, each of the six illuminatable portions comprising the same number corresponding to the number of the fret.

18. The computer-implemented method of claim 16 wherein the illuminating comprises illuminating the fret numbers adjacent the strings on the fret board for lengths of time corresponding to the lengths of time that the notes are to be played.

19. The computer-implemented method of claim 16 further comprising simultaneously displaying on a display a running tab of a song corresponding to the illuminated frets on the fret board.

20. The computer-implemented method of claim 19 wherein the illuminating fret numbers for each string is color coordinated to the color of the strings on the running tab.

21. The computer-implemented method of claim 16 further comprising simultaneously displaying on a display at least one of a front view of a guitarist playing the song, and an over the shoulder view of a guitarist playing the song.

22. The computer-implemented method of claim 16 further comprising illuminating a plurality of fret numbers corresponding to a same string to indicate playing the open string.

23. The computer-implemented method of claim 16 further comprising monitoring the playing of the strings of the guitar by the user in real-time when playing a song illuminated on the fret board.

24. The computer-implemented method of claim 23 further comprising indicating an accuracy of the user playing the song.

25. The computer-implemented method of claim 16 wherein the guitar comprises a plurality of light strips disposed in the guitar.

26. The computer-implemented method of claim 25 wherein the fret board comprises a plurality of holes disposed adjacent each string in each fret.

27. The computer-implemented method of claim 26 wherein the fret board comprises a plurality of sleeves disposed in the holes through which the light from the light strips travel.

28. The computer-implemented method of claim 16 wherein the fret board comprises a plurality of numbered fret caps.

29. The computer-implemented method of claim 16 further comprising at least one of a body and a head stock of the guitar having a display, and displaying digital special effects on the at least one body and head stock.

30. The computer-implemented method of claim 16 further comprising holographic display panels disposable over the fret board of the guitar.

31. At least one program storage device readable by a machine, tangibly embodying at least one program of instructions executable by the machine to perform a method for use by a user in learning to play a guitar having a plurality of strings and a fret board, the method comprising:
    selectively illuminating fret numbers adjacent the strings on the fret board of the guitar corresponding to strings and fret positions to be engaged by the user when playing a song; and
    wherein the selective illumination of the fret board generally corresponds to the fret numbers on strings in a guitar tablature for playing the song, and
    wherein each illuminated fret number corresponds to a string and a fret to show the user which string and fret to be engaged to play a particular note or chord.

* * * * *